July 5, 1966
H. E. SCHWARZBACH
3,259,419
RELEASEABLE HOIST HOOK
Filed May 4, 1964
2 Sheets-Sheet 1
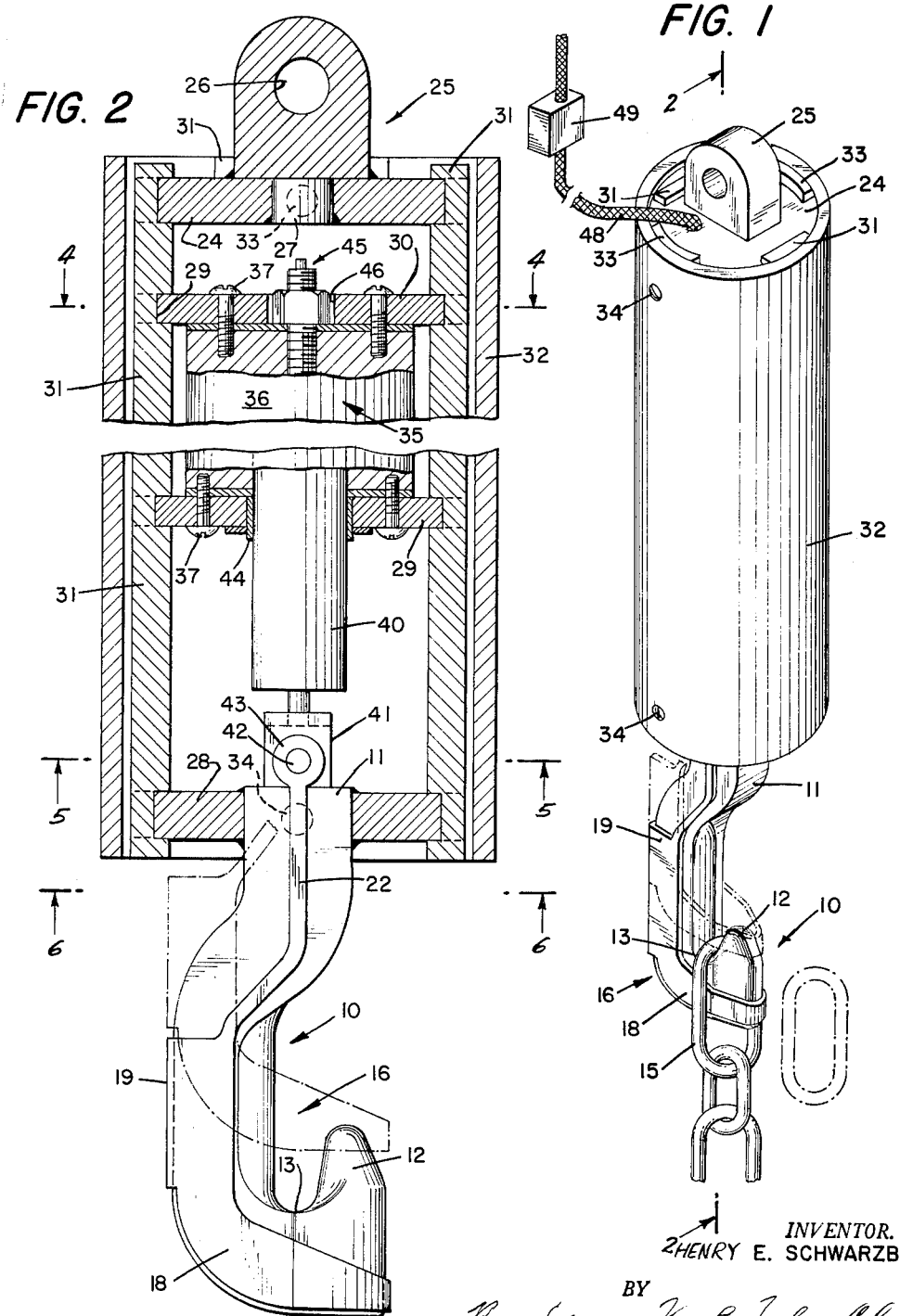
INVENTOR.
HENRY E. SCHWARZBACH
BY 
ATTORNEYS July 5, 1966  H. E. SCHWARZBACH  3,259,419
RELEASEABLE HOIST HOOK
Filed May 4, 1964  2 Sheets-Sheet 2

*INVENTOR.*
HENRY E. SCHWARZBACH
BY

ATTORNEYS

United States Patent Office 3,259,419
Patented July 5, 1966

3,259,419
RELEASABLE HOIST HOOK
Henry E. Schwarzbach, Pittsburgh, Pa., assignor to
American Chain & Cable Company, Inc.
Filed May 4, 1964, Ser. No. 364,603
1 Claim. (Cl. 294—83)

This invention relates to hoists equipped with a hook for lifting loads and, more particularly, to a hoist device having remotely controlled release means for automatically removing the load from the hook.

Remote control means for automatically releasing loads from hook-type hoists are of considerable advantage in many industrial operations. Such a device renders it unnecessary for personnel to follow a movable hoist to its point of unloading to unhook the chains or other means supporting the load. Not only is this more economical but it can be of great significance from the standpoint of safety because it may permit release of the hooks in regions not safely accessible to personnel. This is so, for example, when the new releasable hooks are used to detach billets or other metal stock after they have been lowered by the hoist into cooling pits for heat treatment.

In accordance with the invention, the new device for supporting a load by means of a sling generally comprises a hook, load-disengaging means, suspension means and displacement means. The hook comprises a shank portion, an end portion disposed lower than the top of the shank portion, and a load-bearing portion interconnecting the shank and end portions and disposed lower than the end portion with the sling supported across the load-bearing portion. The load-disengaging means is nominally located adjacent the hook beneath the load-bearing portion and is displaceable alongside the hook to a position above the end portion. The shank portion of the hook depends in fixed relation from the suspension means. Mounted on the suspension means and linked to the load-disengaging means is the displacement means which is selectively operable by remote control to move the load-disengaging means to its position above the hook end portion to release the sling from the device.

This new releasable hoist hook may be used as a single assembly or it can be mounted on single or double spreader bars. The term "sling" as used herein is to be understood to mean chain, wire or fibrous rope, or other rigid or flexible supporting means. In the case of a chain, one link may be fitted over the hook as mentioned in the following detailed description or the length of chain may be laid across the hook in the manner of a rope sling. In any event, the releasable hoist hook permits the sling to be lifted by the load-disengaging means from the load-bearing portion of the hook and dropped off of the hook over its end portion, all in an automatic manner by remote control without the attention of personnel in the immediate area of the hoist. An important feature of the device is that the displacement means which effects this load-disengaging function may be of limited force to make it impossible for loads of a certain weight to be released under circumstances where it might be dangerous to do so.

A preferred embodiment of the invention is described hereinbelow with reference to the accompanying drawing, wherein FIG. 1 is a perspective view of the assembled device supporting the end of a chain;

FIG. 2 is a vertical section taken generally along the line of 2—2 of FIG. 1;

Figure 6:
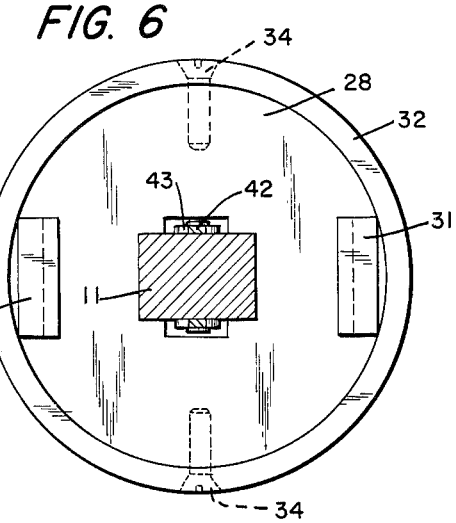
FIG. 6 is a section taken along the line 6—6 of FIG. 2.

As shown in FIGS. 1, 2 and 6, the device includes a hook 10 comprising a shank portion 11 of rectangular cross section and a point or end portion 12 disposed lower than the top of the shank portion 11. Interconnecting the shank and end portions 11 and 12 is a load-bearing portion 13 which curves lower than the end portion 12 so that a sling may be supported across it in the conventional manner. As shown in the drawings, the sling is represented by an end link 15 of chain which in turn supports the load to be hoisted.

Fitted about the hook 10 is a unique load-disengaging means 16 which is nominally located adjacent the hook beneath the load-bearing portion 13 and is disposable alongside the hook to a position above the end portion 12. This nominal position of the load-disengaging means is shown in solid lines in FIGS. 1 and 2 and its elevated position is shown in dotted lines. The load-disengaging means 16 includes a substantially U-shaped lifting element 18 extending along opposite sides of the hook load-bearing portion 13 and around the hook end portion 12. The upper surface of the lifting element 18 angles downwardly toward the free end of the hook as shown in FIG. 2 to assist in release of the load during operation. Extending around the back of the shank portion 11 remote from the end portion 12 is a guiding element 19 of the load-disengaging means 16 which insures that the load-disengaging means slides in a controlled manner during its vertical displacement. The outer surface of much of the hook 10 and the interior of the load-disengaging means 16 may be defined by faired conforming surfaces to reduce friction and permit smooth relative motion. A pair of supporting elements 22 extends upwardly along opposite sides of the hook shank portion 11 so that the load-disengaging means 16 may be moved in the manner described below.

As shown particularly in FIGS. 2 to 6, the device includes suspension means comprising an upper mounting plate 24 on which is affixed an eye fitting 25 formed with a hole 26. A cylindrical portion 27 of the eye fitting 25 extends downwardly into a central seat in the plate 24 to provide a more secure attachment between those parts. The entire assembly may be suspended from a hoist by means of the eye fitting 25. Spaced from the plate 24 is a lower plate 28 to which the hook shank portion 11 is attached and from which it depends. A pair of intermediate plates 29 and 30 are located between the plates 24 and 28 and all of the plates are held in parallel fixed relation by interconnecting bars 31. The bars 31 are notched to fit into corresponding notches in the plates and all of these elements are housed within a casing 32. It is not necessary to secure the bars 31 to the plates by means other than these notches if the casing 32 fits properly, but they may be welded if desired. The casing 32 may be supported by upper opposed tongues 33 overlying the upper plate 30 and by screws 34.

Figure 3:
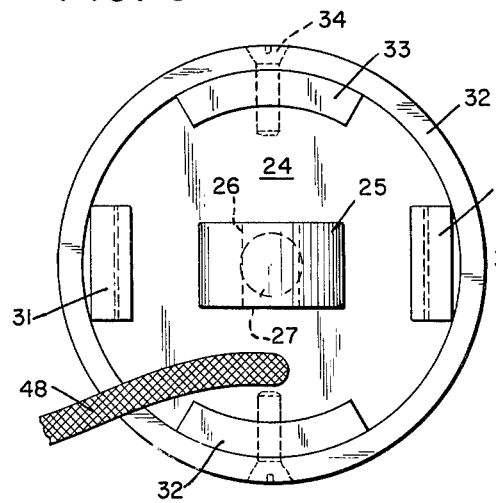
FIG. 3 is a plan view of the top of the device.
Figure 4:
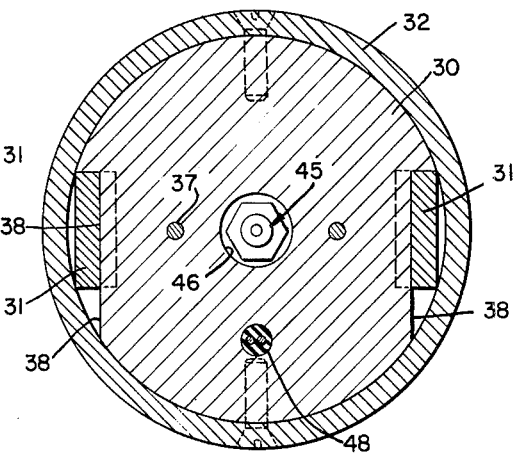
FIG. 4 is a section taken along the line of 4—4 of FIG. 2.
Figure 5:
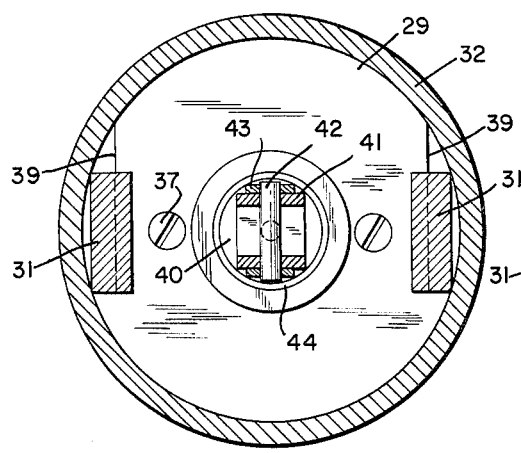
FIG. 5 is a section taken along the line 5—5 of FIG. 2.

Displacement means 35 are provided which are selectively operable by remote control to move the lifting element 18 of the load-disengaging means 16 to its dotted line position above the hook end portion 12 to release the chain link 15 from the device. The displacement means may be electrical, hydraulic, pneumatic, or even mechanical so long as it fulfills the function described herein. In this embodiment, an electrical solenoid coil 36 (only exteriorly visible in the drawing) is located between the intermediate plates 29 and 30 of the suspension means and is held in place by screws 37. As shown in FIGS. 4 and 5, the plates 29 and 30 are formed with cutouts 38 and 39 to permit them to be fitted between the bars 31 during assembly after the coil 36 is attached to the plates 29 and 30. The coil is equipped with a solenoid plunger 40 which extends through the lower intermediate plate 29 and is vertically movable within the coil. The plunger 40 has a yoke 41 secured to its lower extremity, and this yoke 41 is linked by means of a pin 42 to lugs 43 at the upper ends of the supporting elements 22 of the load-disengaging means 16.

In FIG. 2, the plunger 40 is shown in its lowermost position with the yoke 41 abutting the upper end of the hook shank portion 11, and when the solenoid coil is activated the plunger 40 rises to operate the load-disengaging means 16. A bushing 44 within the lower intermediate plate 29 is provided to control this vertical motion of the plunger 40. To limit the maximum stroke of the plunger 40, an adjustment screw and nut assembly 45 of a conventional type is provided extending from the solenoid coil 36 through a hole 46 in the upper intermediate plate 30. To activate the solenoid coil 36, an insulated conductor 48 may extend through the plates 24 and 30 to the remote control station.

Whether the displacement means 35 is electrical as described herein, or hydraulic or pneumatic, it may be readily adapted by conventional means to exert only a limited moving force on the load-disengaging means 16. This is represented at 49 by variable current-limiting circuitry which establishes a maximum force output exerted on the plunger 40 when the coil 36 is activated. Consequently, the device may be adjusted so that it can release a load automatically only when a load within a certain limit is imposed on the chain link 15 or other form of sling. Hence, the operator at his remote control station cannot accidentally release a heavy load when, for example, the hoist is in the process of transporting the load, and he may be permitted to carry out the release only when the load has been lowered in place and the force on the load-disengaging means 16 has been reduced. However, whenever the load-disengaging function is made possible, it is quickly and efficiently carried out by the upward actuation of the plunger 40 which strips the lifting element 18 up around the hook 10 and drops the chain or other sling over the end portion 12 of the hook.

I claim:
A device for supporting a load by means of a sling comprising
 (a) a hook comprising
  (i) a shank portion,
  (ii) an end portion disposed lower than the top of the shank portion, and
  (iii) a load-bearing portion interconnecting the shank and end portions and disposed lower than the end portion with the sling supported across the load-bearing portion;
 (b) load-disengaging means nominally located adjacent said hook beneath the load-bearing portion and displaceable alongside said hook to a position above said end portion, said load-disengaging means comprising
  (i) a substantially U-shaped lifting element extending along opposite sides of the load-bearing portion and around the end portion,
  (ii) a guiding element extending around the shank portion remote from the end portion, and
  (iii) a pair of supporting elements extending upwardly along opposite sides of the shank portion;
 (c) suspension means comprising
  (i) an upper mounting plate,
  (ii) a lower plate from which the hook shank portion depends,
  (iii) a pair of intermediate plates, and
  (iv) interconnecting means holding said plates in fixed relation; and
 (d) displacement means selectively operable by remote control to move the lifting element of said load-disengaging means to said position above the hook end portion to release the sling from the device, said displacement means being adapted to exert a limited moving force on said load-disengaging means and comprising
  (i) an electrical solenoid coil supported between said intermediate plates of the suspension means, and
  (ii) a solenoid plunger vertically movable within said coil and linked to said supporting elements to effect displacement of said load-disengaging means.

References Cited by the Examiner

FOREIGN PATENTS 556,613 4/1923 France.
303,259 9/1920 Germany.
107,269 10/1924 Switzerland.

GERALD M. FORLENZA, *Primary Examiner.*

G. F. ABRAHAM, *Assistant Examiner.*